(12) United States Patent
Ogawa et al.

(10) Patent No.: US 9,088,173 B2
(45) Date of Patent: Jul. 21, 2015

(54) CONTROL APPARATUS, CONTROL METHOD OF SUPPLY APPARATUS, AND SUPPLY SYSTEM

(75) Inventors: Takashi Ogawa, Aichi (JP); Mitsugu Kobayashi, Aichi (JP); Mitsuhiro Mabuchi, Aichi (JP); Yuichi Hirayama, Aichi (JP)

(73) Assignee: Kabushiki Kaisha Toyota Jidoshokki (JP)

( * ) Notice: Subject to any disclaimer, the term of this patent is extended or adjusted under 35 U.S.C. 154(b) by 510 days.

(21) Appl. No.: 13/637,673

(22) PCT Filed: Mar. 24, 2011

(86) PCT No.: PCT/JP2011/057239
§ 371 (c)(1),
(2), (4) Date: Oct. 23, 2012

(87) PCT Pub. No.: WO2011/125525
PCT Pub. Date: Oct. 13, 2011

(65) Prior Publication Data
US 2013/0200718 A1    Aug. 8, 2013

(30) Foreign Application Priority Data

Apr. 5, 2010    (JP) ................. 2010-087034

(51) Int. Cl.
*H02J 7/02* (2006.01)
*B60L 5/00* (2006.01)
*B60L 11/18* (2006.01)
(Continued)

(52) U.S. Cl.
CPC ............... *H02J 7/025* (2013.01); *B60L 5/005* (2013.01); *B60L 11/182* (2013.01); *B60M 7/003* (2013.01); *Y02T 10/7005* (2013.01); *Y02T 90/122* (2013.01); *Y02T 90/14* (2013.01)

(58) Field of Classification Search
USPC ........................................ 307/104
See application file for complete search history.

(56) References Cited

U.S. PATENT DOCUMENTS

2007/0139000 A1    6/2007   Kozuma et al.
2008/0133085 A1    6/2008   Harumoto et al.
2008/0231120 A1    9/2008   Jin
(Continued)

FOREIGN PATENT DOCUMENTS

CN    101196625 A    6/2008
CN    101272063      9/2008
(Continued)

OTHER PUBLICATIONS

International Patent Application No. PCT/JP2011/057239, International Search Report, dated Jun. 21, 2011, 2 pages.
(Continued)

*Primary Examiner* — Robert Deberadinis
(74) *Attorney, Agent, or Firm* — Baker & Hostetler LLP

(57) ABSTRACT

A control apparatus 13 outputs an order signal to order supply apparatuses 12-1 through 12-N to perform supply of a signal in a contactless manner at a respectively different timing. The control apparatus 13 determines that a moving apparatus 11 is stopped at the position of the supply apparatus 12 being the output destination of the signal output order, when a wireless signal is received from the moving apparatus 11 within a certain period of time after outputting the order signal. Then, the supply apparatus 12 at the position at which the moving apparatus 11 is ordered to start supplying a signal.

9 Claims, 11 Drawing Sheets

(51) Int. Cl.
*B60M 7/00* (2006.01)
*H01F 27/42* (2006.01)

(56) References Cited

U.S. PATENT DOCUMENTS

| 2009/0003022 | A1 | 1/2009 | Nunoya et al. |
| 2010/0225172 | A1 | 9/2010 | Kozuma et al. |

FOREIGN PATENT DOCUMENTS

| JP | 8-237890 | 9/1996 |
| JP | 2005-168232 | 6/2005 |
| JP | 2006-246633 | 9/2006 |
| JP | 2008-233064 A | 10/2008 |
| JP | 2008-288889 | 11/2008 |
| JP | 3148265 | 1/2009 |
| JP | 2009-201328 | 9/2009 |
| WO | WO 2005/096485 | 10/2005 |

OTHER PUBLICATIONS

Chinese Patent Application No. 201180017680.2: Notification of the First Office Action dated May 4, 2014, 25 pages.
Chinese Patent Application No. 201180017680.2: Notification of the Second Office Action dated Jan. 19, 2015, 25 pages.
Machine translation of Japanese Patent Application No. 2008-233064 A, dated Oct. 2, 2008, 73 pages.

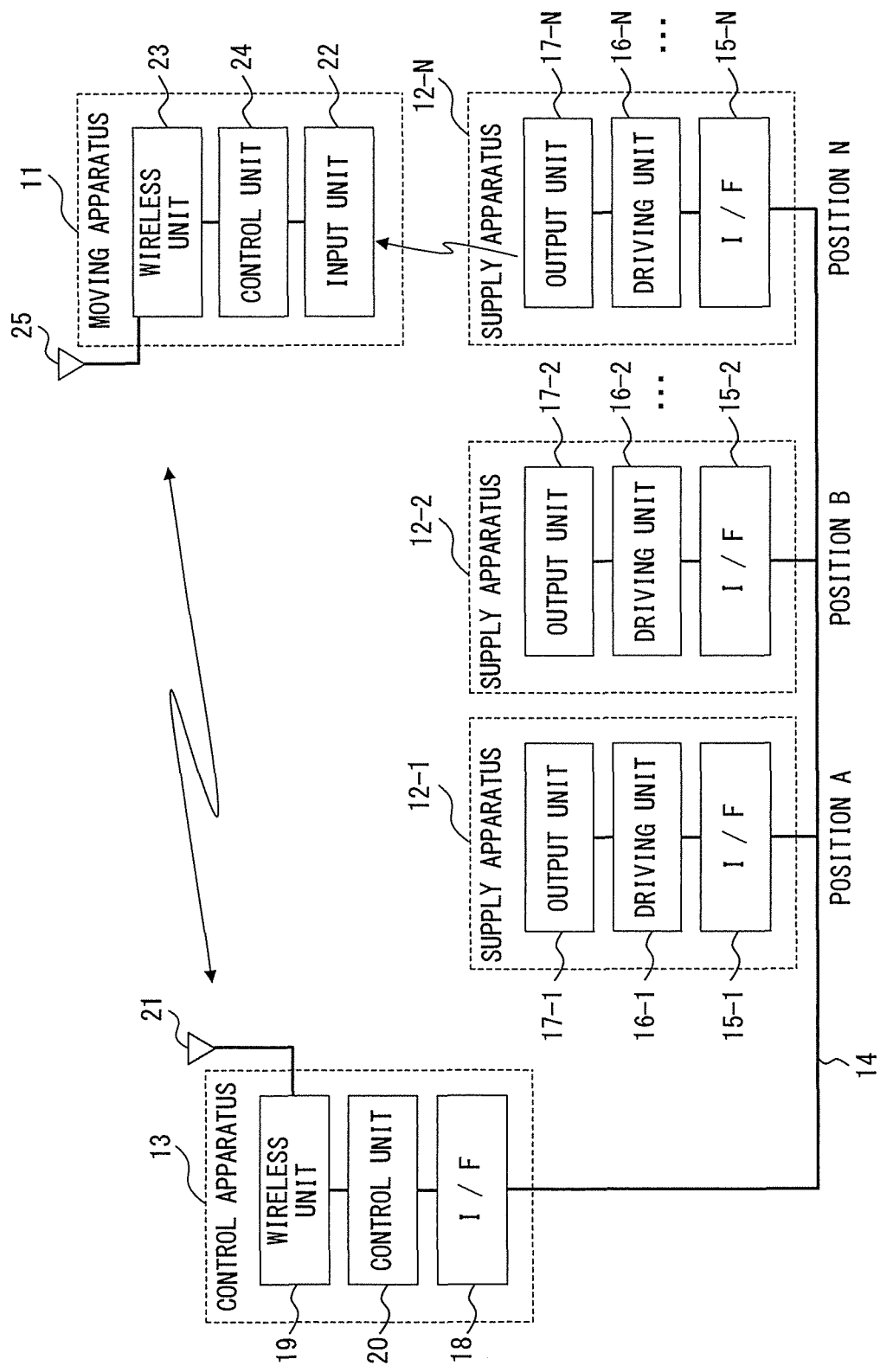
F I G. 1

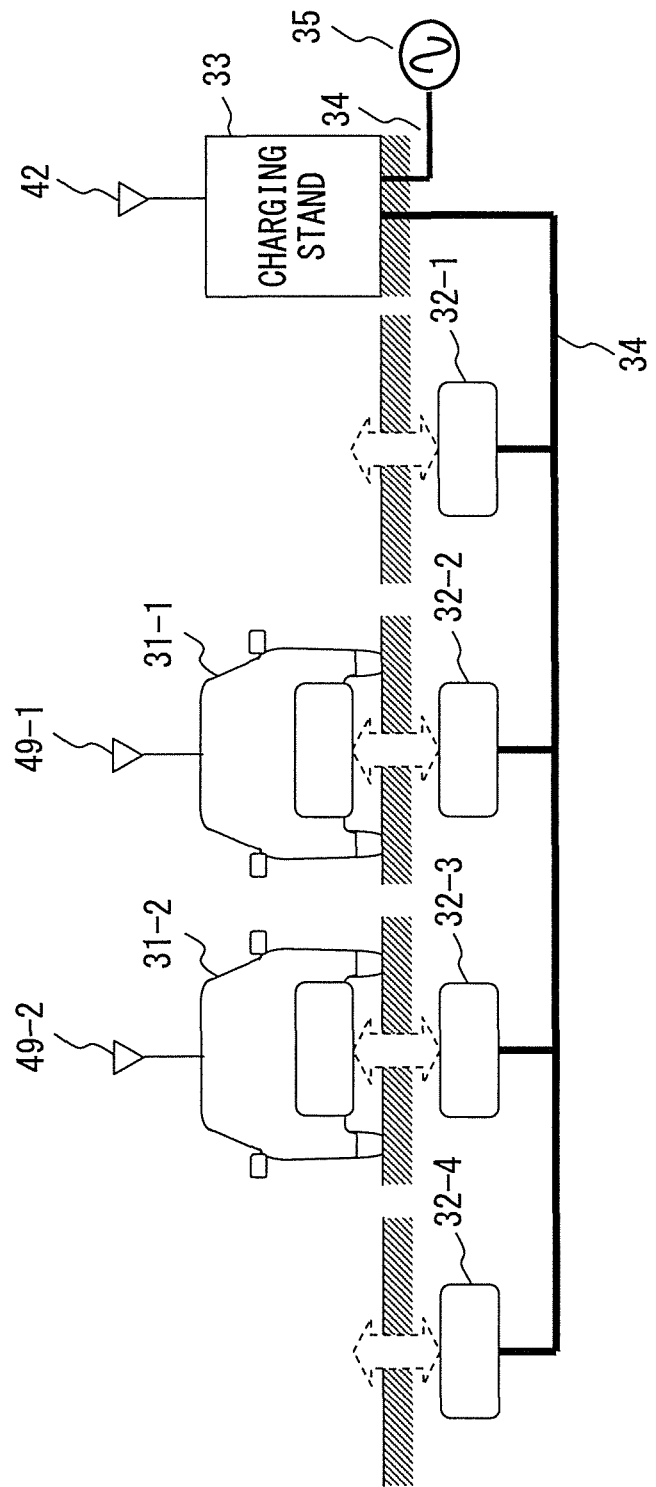
F I G. 3

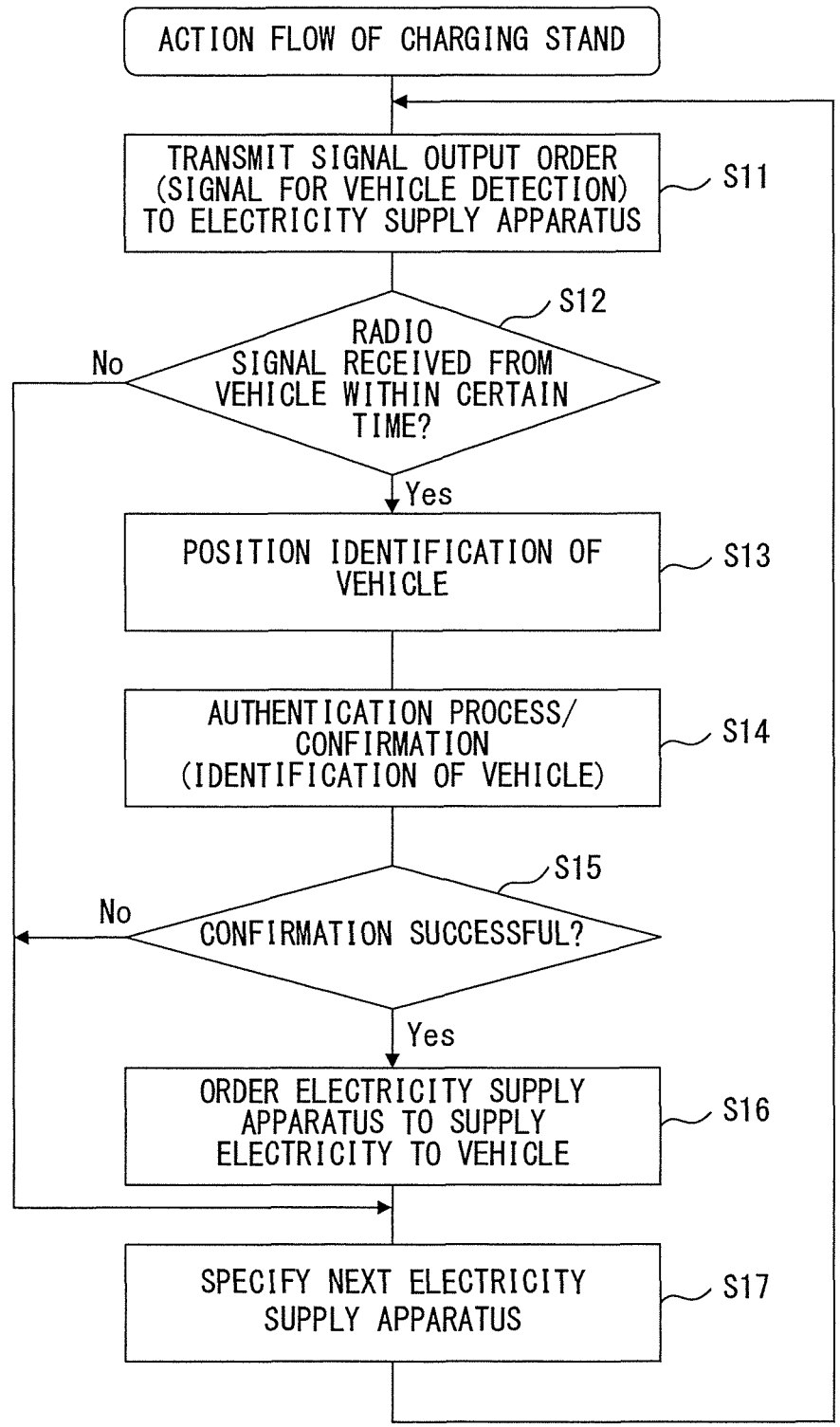
F I G. 5

CONTROL APPARATUS, CONTROL METHOD OF SUPPLY APPARATUS, AND SUPPLY SYSTEM

CROSS-REFERENCE TO RELATED APPLICATIONS

This application is the National Stage of International Application No. PCT/JP2011/057239, filed Mar. 24, 2011, which claims the benefit of Japanese Application No. 2010-087034, filed Apr. 5, 2010, the disclosures of which are incorporated herein by reference in their entireties for any and all purposes.

BACKGROUND OF THE INVENTION

1. Field of the Invention

The present invention relates to a control apparatus to control a supply apparatus that supplies electricity and the like in a contactless manner to a moving apparatus, a method of controlling it, and a supply system.

2. Description of the Related Art

The PHV (plug-in hybrid vehicle) and an electric vehicle are at the practical usage stage, and charging facility for charging those vehicles has been required.

Conventionally a charging method for charging by connecting a vehicle and a charging apparatus by a cable has been considered. However, it is troublesome to connect the cable with every charging. Therefore, a method for charging the battery of a vehicle in a contactless manner has been considered.

Patent Document 1 describes that, in a communication coil used for a contactless power supply apparatus, communication with a good anti-noise characteristic is realized by cancelling out unwanted electromagnetic wave by devising the winding shape.

Incidentally, in an electricity supply system having a plurality of electricity supply apparatuses to supply electricity to a vehicle, it is required to identify the position of which electricity supply apparatus the vehicle is stopped at. Therefore, for example, providing a sensor to detect the vehicle in each electricity supply apparatus, and starting charging by detecting the presence/absence of a vehicle by the sensor would be possible.

PRIOR ART DOCUMENTS

Patent Documents

Patent Document 1: Japanese Laid-open Patent Publication No. 2008-288889

SUMMARY OF THE INVENTION

Problem to be Solved by the Invention

It is an objective of the present invention to make is possible to identify, in a control apparatus that controls a plurality of supply apparatuses that supply a signal to a moving apparatus in a contactless manner, the position of which supply apparatus the moving apparatus is stopped at.

Means for Solving the Problem

A control apparatus according to the present invention is a control apparatus configured to control a plurality of supply apparatuses that supply a signal to a moving apparatus in a contactless manner, including a wireless unit configured to perform transmission/reception of a wireless signal; and a control unit configured to output an order signal to order a plurality of supply apparatuses to perform supply of a signal in a contactless manner at a respectively different timing, and also to determine that the moving apparatus is stopped at a position of the supply apparatus being an output destination of the order signal, when a wireless signal is received in the wireless unit from the moving apparatus within a certain period of time after outputting the order signal.

By the above configuration, it becomes possible to identify the position of which supply apparatus among a plurality of supply apparatus the moving apparatus is stopped at.

In the above control apparatus, the supply apparatus is an apparatus that supplies electricity to the moving apparatus in a contactless manner, and the control unit outputs a signal to the supply apparatus being an output destination of the order signal to order start of supply or electricity, when a wireless signal is received in the wireless unit from the moving apparatus within a certain period of time after outputting the order signal.

By the above configuration, it becomes possible to identify the position of which electricity supply apparatus the moving apparatus is stopped at, and to order the identified electricity supply apparatus to start supplying electricity.

In the above control apparatus, the control unit makes a first order signal to order a first supply apparatus among the plurality of supply apparatuses to supply a signal valid for a certain period of time, to make the first supply apparatus supply a signal in a contactless manner, and after that, making the first order signal invalid, and makes a second order signal to order a second supply apparatus to supply a signal valid for a certain period of time, to make the second supply apparatus supply a signal in a contactless manner, and after that, makes the second order signal invalid.

By the above configuration, it becomes possible to identify the position of which supply apparatus the moving apparatus is stopped at, by determining whether or not a wireless signal is received from the moving apparatus within a certain period of time after making the first supply apparatus supply a signal in a contactless manner, or whether or not a wireless signal is received from the moving apparatus within a certain period of time after making the second supply apparatus supply a signal.

In the above control apparatus, the control unit transmits the order signal by power line communications to the plurality of supply apparatuses.

By the above configuration, it becomes possible to perform the communication between the control apparatus and the supply apparatus using a power line.

Effect of the Invention

According to the present invention, it becomes possible to identify the position of which supply apparatus, among a plurality of supply apparatus that supply a signal to a moving apparatus in a contactless manner, the moving apparatus is stopped at.

BRIEF DESCRIPTION OF THE DRAWINGS

FIG. 1 is a diagram illustrating the configuration of a supply system according to the first embodiment.

FIG. 3 is a diagram illustrating an example of an electricity supply system that supplies electricity to a vehicle.

FIG. 5 is a flowchart illustrating the actions of a charging stand.

DESCRIPTION OF EMBODIMENTS

Figure 2:
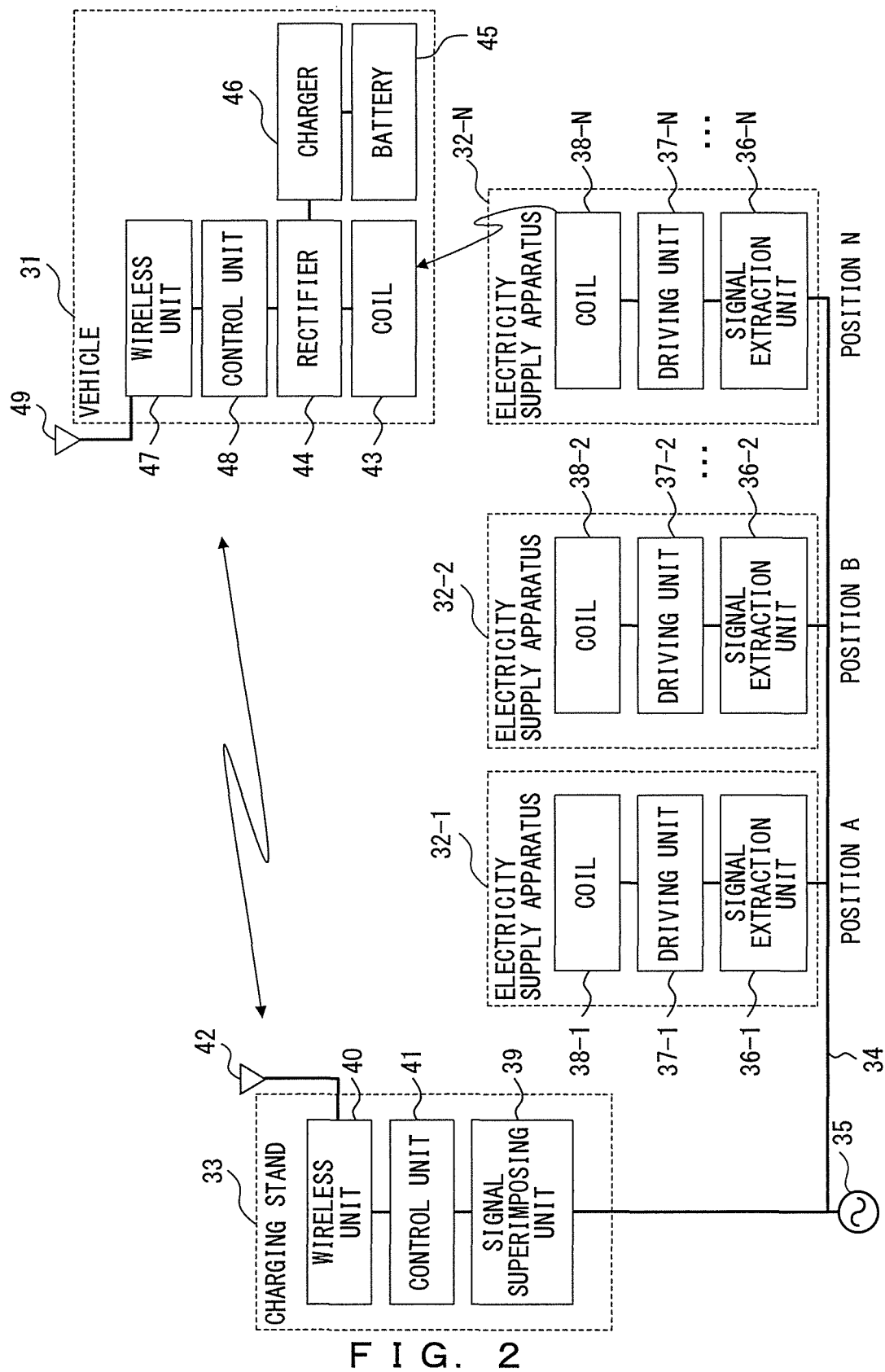
FIG. 2 is a diagram illustrating the configuration of an electricity supply system according to the second embodiment.

Hereinafter, embodiments of the present invention are described. FIG. 1 is a diagram illustrating the configuration of a supply system according to the first embodiment.

The supply system includes a plurality of supply apparatuses 12-1 through 12-N that supply a signal (including electricity) to a moving apparatus 11 in a contactless manner, and a control apparatus 13 that controls the supply of the signal from the plurality of supply apparatuses 12-1 through 12-N to the moving apparatus 11

The supply apparatus 12-1 includes an interface unit (I/F) 15-1 that receives a signal transmitted through a signal line 14 from the control apparatus 13, a driving unit 16-1, and an output unit 17-1 that releases a signal to space. The output unit 17-1 is, for example, a coil, which releases a signal to space.

Upon receiving a signal output order of the control apparatus 13 through the interface unit 15-1, the driving unit 16-1 drives the output unit 17-1 to make it release a signal to space. Accordingly, when the moving apparatus 11 is stopped at the position of the supply apparatus 12-1, a signal is transmitted from the supply apparatus 12-1 to the moving apparatus 11 in a contactless manner. Other supply apparatuses 12-2 through 12-N have the same configuration as the supply apparatus 12-1, and respectively includes I/F units 15-2 through 15-N, driving units 16-2 through 16-N and output units 17-2 through 17-N.

The supply apparatus 12-1 is placed at a position A that is at a distance A from the control apparatus 13, and the supply apparatus 12-2 is placed at a position B that is at a distance B (B>A) from the control apparatus 13. The supply apparatus 12-N is placed at a position N that is at a distance N (N>B) from the control apparatus 13.

The control apparatus 13 includes an interface (I/F) unit 18 that performs wired communication with the supply apparatus 12-1 through 12-N, a wireless unit 19 that performs wireless communication with the moving apparatus 11, and a control unit 20 that controls them. The wireless unit 19 includes an antenna 21 for transmitting/receiving a wireless signal.

The moving apparatus 11 includes in input unit 22 that receives a signal supplied from the supply apparatus 12-N in a contactless manner, a wireless unit 23 that performs wireless communication with the control apparatus 13, and a control unit 24 that controls them. The wireless unit 23 includes an antenna 25 for transmitting/receiving a wireless signal. The input unit 22 is, for example, a coil and the like, and receives a signal supplied from the supply apparatus 12-N in a contactless manner. The moving apparatus 11 is, for example, an electric vehicle, an unmanned carrier, a self-contained robot and the like used in a factory and the like.

Hereinafter, the actions of the supply system described above are explained regarding a case in which the moving apparatus 11 is stopped at the position of the supply apparatus 12-N and the moving apparatus 11 is not stopped at the positions of other supply apparatuses.

The control apparatus 13 outputs a signal output order signal to order the supply apparatus 12-1 through 12-N to perform the supply of a signal in a contactless manner at a respectively different timing.

The control apparatus 13 first issues a signal output order to order the supply apparatus 12-1 to output a signal valid (for example, a high level) for a certain period of time for example, and makes the supply apparatus 12-1 output a signal in a contactless manner. After that, the signal output order is made invalid (for example, a low level).

Next, after the signal output order to the supply apparatus 12-1 is made invalid, the control apparatus 13 issues a signal output order to order the supply apparatus 12-2 to output a signal valid (hereinafter described as the high level) for a certain period of time for example, and makes the supply apparatus 12-2 output a signal in a contactless manner. After that, the signal output order is made invalid (hereinafter, described as the low level). Subsequently, in a similar manner, the high level signal output order is issued to the supply apparatus 12-3 through 12-N sequentially to make each of the supply apparatus 12-3 through 12-N output a signal in a contactless manner. After that, the signal output order for each is made to the low level.

After outputting the high level signal output order to the supply apparatus 12-1 through 12-N for a certain period of time, the control apparatus 13 checks whether or not a wireless signal is transmitted from the moving apparatus 11 within a certain period of time (a certain period of time that is different from the period in which the signal output order is at the high level). Then, when a wireless signal is transmitted from the moving apparatus 11, it is determined that the moving apparatus 11 is stopped at the position of the supply apparatus (one of 12-1 through 12-N) being the output destination of the signal output order. When no wireless signal is transmitted, it is determined that the moving apparatus 11 is not stopped at the supply apparatus being the output destination of the signal output order.

According to the first embodiment described above, whether or not the moving apparatus 11 is stopped at the position of the supply apparatus (one of 12-1 through 12-N) being the output destination of the signal output order may be determined by giving a signal output order sequentially to the plurality of supply apparatuses 12-1 through 12-N and by determining whether a wireless signal from the moving apparatus 11 is transmitted within a certain period of time. Therefore, since there is no need to provide a sensor and the like in the electricity supply apparatuses 12-1 through 12-N to detect the moving apparatus 11, the cost for the apparatus may be reduced.

Since the supply apparatus at which the moving apparatus 11 is stopped may be identified among the plurality of supply apparatuses 12-1 through 12-N, it becomes possible to order the supply apparatuses of the position at which the moving apparatus is stopped at to start supplying a signal.

Next, FIG. 2 is a diagram illustrating the configuration of the electricity supply system according to the second embodiment. The electricity supply system includes a plurality of electricity supply apparatuses 32-1 through 32-N that supply electricity to a vehicle 31 in a contactless manner, and a charging stand 33 (corresponding to the control apparatus) that controls the supply of electricity of the electricity supply apparatuses 32-1 through 32-N.

The charging stand 33 and the electricity supply apparatuses 32-1 through 32-N are connected to an alternating-current source 35 by a power line 34, and electricity is supplied from the alternating-current source 35 to each of the electricity supply apparatuses 32-1 through 32-N. The communication between the charging stand 33 and the electricity supply apparatuses 32-1 through 32-N is performed by PLC: Power Line Communications.

The electricity supply apparatus 32-1 includes a signal extraction unit 36-1 that extracts a signal transmitted through the power line 34 from the control apparatus 33, a driving unit 37-1 that outputs electricity supplied from the power line 34 to a coil 38-1, and the coil 38-1 that releases electricity to space. The other electricity supply apparatuses 32-2 through 32-N have a similar configuration, respectively including signal extraction units 36-2 through 36-N, driving units 32-2 through 32-N, and coils 38-2 through 38-N. Meanwhile, the part that supplies electricity in a contactless manner is not limited to the coil 38-1, and may be one that optically transmits energy.

The electricity supply apparatus 32-1 is placed at a position A at a distance A from the charging stand 33, and the electricity supply apparatus 32-2 is placed at a position B at a distance B (B>A) from the charging stand 33. The electricity supply apparatus 32-N is placed at a position N at a distance N (N>B) from the charging stand 33.

The charging stand 33 includes a signal superimposing unit 39 that superimposes and outputs a signal to the power line 34, a wireless unit 40, and a control unit 41 that controls them. A wireless unit 40 has an antenna 42 for transmitting/receiving a wireless signal.

A vehicle 31 includes a coil 43 that receives electricity in a contactless manner, an rectifier 44 that rectifies the alternating-current voltage output from coil 43, a battery 45, a charger 46 that charges the battery 45 by the output voltage of the rectifier 44, a wireless unit 47, and a control unit 48 that performs the overall control. The wireless unit 47 includes an antenna 49 for transmitting/receiving a wireless signal.

FIG. 3 is a diagram illustrating an example of an electricity supply system according to the second embodiment (the communication between the charging stand and the electricity supply apparatus is PLC). In the electricity supply system illustrated in FIG. 3, the charging stand 33 and the electricity supply apparatuses 32-1 through 32-4 are connected by the power line 34, and the signal output order output from the charging stand 33 is superimposed into the power line 34 in the charging stand 33 and is output to each of the electricity supply apparatuses 32-1 through 32-4.

The electricity supply apparatuses 32-1 through 32-4 are buried in the ground, and alternating-current power is supplied from the alternating-current source 35 to the electricity supply apparatus 32-1 through 32-4 through the power line 34.

Figure 4:
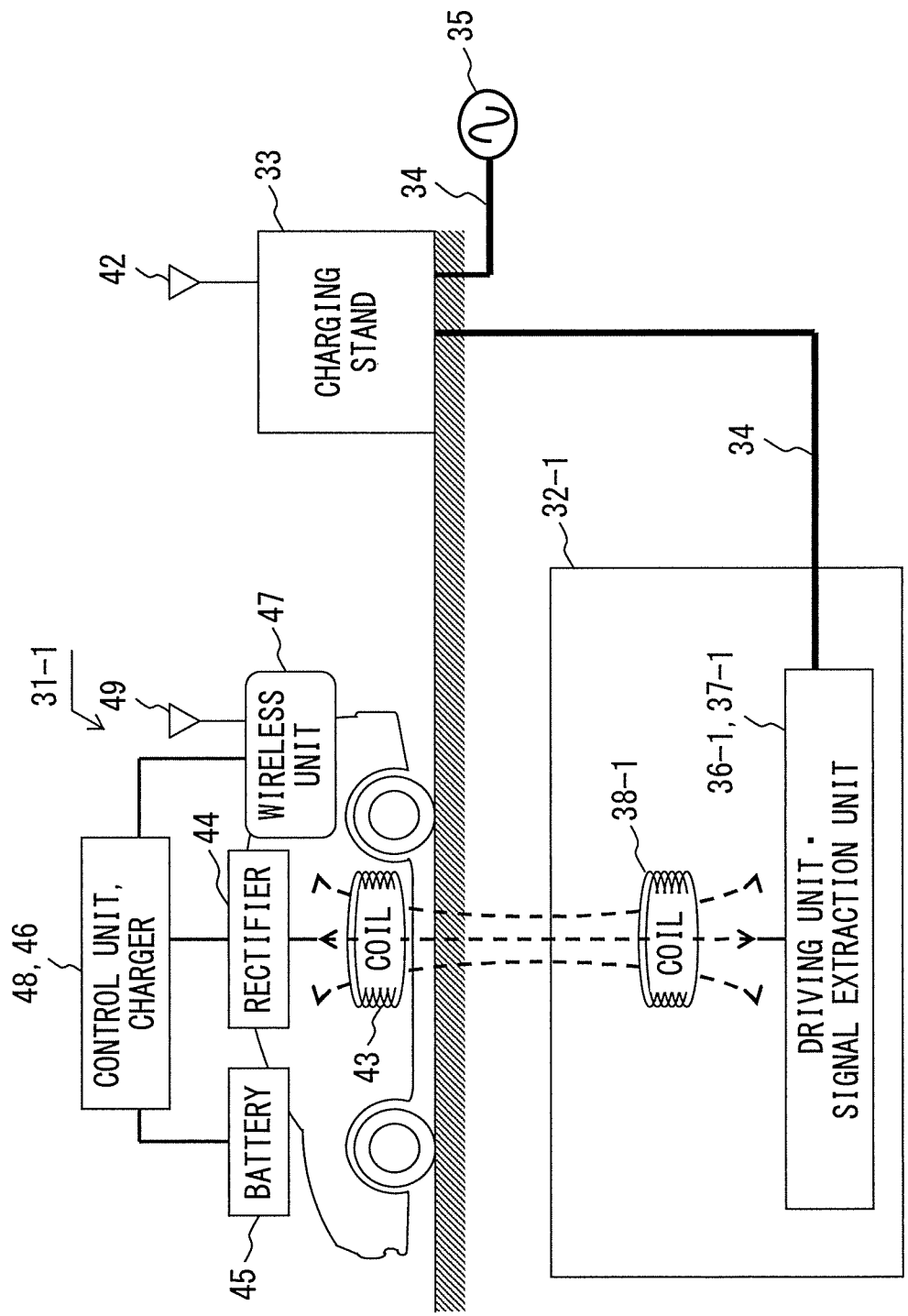
FIG. 4 is a diagram illustrating the configuration of a vehicle and an electricity supply apparatus.

FIG. 4 is a diagram illustrating the structure of the electricity supply apparatus 32-1 and a vehicle 31-1.

The electricity supply apparatus 32-1 is buried in the ground, and the coil 38-1 is placed at a position of a certain depth. Upon receiving a signal output order from the charging stand 33, the electricity supply apparatus 32-1 lets alternating current flow into the coil 38-1 to generate an alternating-current magnetic field. The placing method of the electricity supply apparatus 32-1 is not limited to the method to bury in the ground. For example, only the coil 38-1 may be placed on the surface of the ground, or, the electricity supply apparatus 32-1 or the coil 38-1 may be structured to be movable in the vertical direction, so that they do not interrupt the movement of the vehicle 31.

A coil 43 is placed on the bottom part of the vehicle 31-1, and when the alternating-current magnetic field is generated in the coil 38-1 of the electricity supply apparatus 32-1, alternating-current voltage is generated in the coil 43 by the electromagnetic induction.

The alternating-current voltage is rectified in the rectifier 44 and after that, output to the charger 46 and the control unit 48. The control unit 48 is able to determine whether or not a signal (including electricity) is supplied from the electricity supply apparatus 32-1, by detecting whether or not alternating-current voltage is generated in the coil 43. Then, when it is determined that signal is supplied from the electricity supply apparatus 32-1, a wireless signal is transmitted to the charging stand 33. The wireless signal includes information required for the authentication of the vehicle or the driver, electricity information indicating required electricity for charging the battery 45, and the like.

When a wireless signal is received from the vehicle 31-1 within a certain period time since the signal output order was given to the electricity supply apparatus 32-1, the charging stand 33 determines that the vehicle 31-1- is stopped at the position of the wireless supply apparatus 32-1. Then, an order to start supplying electricity to the vehicle 31-1 is given to the electricity supply apparatus 32-1. Upon receiving a signal ordering the start of electricity supply from the charging stand 33, the electricity supply apparatus 32-1 starts supplying electricity to the vehicle 31-1.

Figure 6:
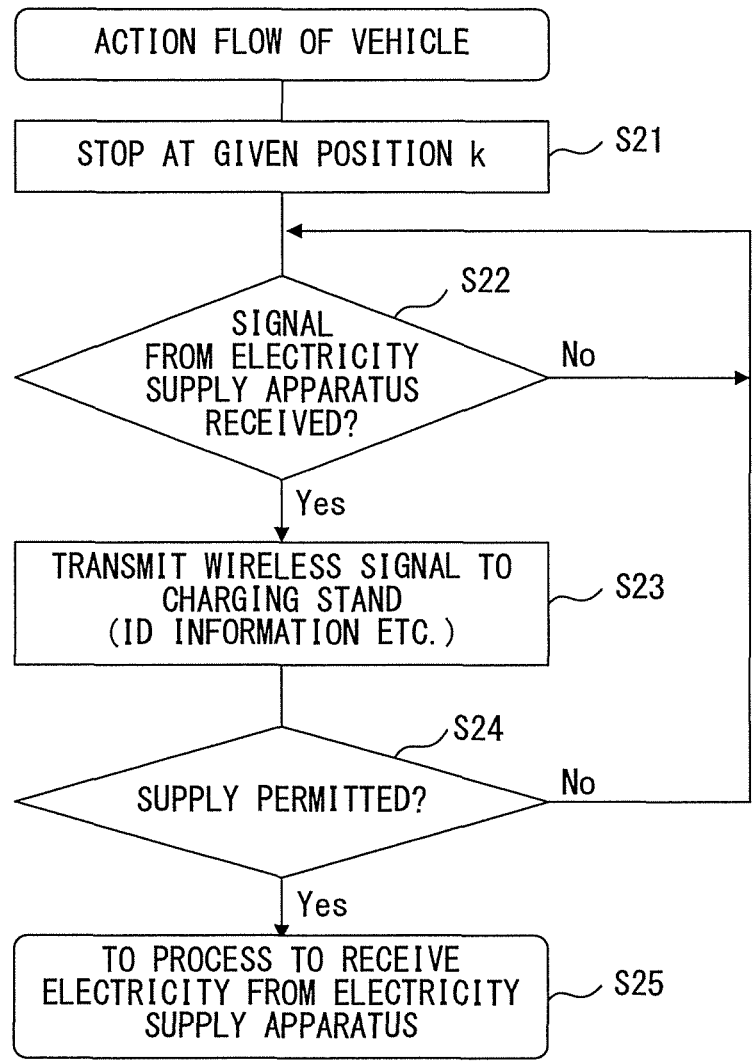
FIG. 6 is a flowchart illustrating the actions of a vehicle.

FIG. 5 and FIG. 6 are flowcharts illustrating actions of the charging stand 33 and the vehicle 31 according to the second embodiment.

The charging stand 33 selects an electricity supply apparatus among the plurality of electricity supply apparatuses 32-1 through 32-N, and outputs a signal output order (signal for vehicle detection) is output to selected electricity supply apparatus (hereinafter, referred to as the electricity supply apparatus 32-k) (S11).

The electricity supply apparatus 32-k that received the signal output order generates an alternating-current magnetic field to a certain period of time and supplies a signal to the outside. At this time, the electricity of the signal supplied by the electricity supply apparatus 32-k is for detecting the presence of the vehicle 31, and may be smaller electricity than the electricity supplied when charging the vehicle 31.

Next, the charging stand 33 determines whether or not a wireless signal is received from the vehicle 31 within a certain period of time after transmitting the signal output order (S12).

When no wireless signal is received within a certain period of time after outputting a signal output order (S12, NO), it is determined that no vehicle is stopped at the position of the electricity supply apparatus 32-k, and the process proceeds to step S17.

On the other hand, when a wireless signal is received within a certain period of time after outputting a signal output order (S12, YES), the process proceeds to step S13 and it is determined that a vehicle 31 is stopped at the position of the electricity supply apparatus 32-k, and the position of the vehicle 31 is identified.

Next, an authentication process/confirmation is performed using identification information included in the wireless signal (S14). Next, whether or not the authentication was successful is determined (S15).

In the process in step S14 and S15, for example, when the electricity supply system according to the embodiment is a system that allows charging of only a vehicle that is registered in advance, authentication is performed by transmitting information to identify the vehicle 31 to the charging stand 33 by a wireless signal. Alternatively, when it is a system that may be used by any person, a credit card number and the like for paying the charging fee is included in the wireless signal and transmitted.

When the authentication is successful (S15, YES), the process proceeds to step S16, and after transmitting a signal to the electricity supply apparatus 32-$k$ to order the start of electricity supply to the vehicle, the process proceeds to next step S17. When the authentication is not successful (S15, No), the process proceeds to step S17.

In step S17, the next electricity supply apparatus is specified (S17). After that, the process returns to step S11, the processes described above are repeated. By sequentially performing the processes described above for N units of electricity supply apparatuses 32-1 through 32-N, the position of the electricity supply apparatuses 32-1 through 32-N at which the vehicle is stopped at may be identified.

FIG. 6 is a flowchart illustrating the actions of a vehicle. The vehicle 31 stops at a given position k (S21). Whether or not a signal supplied from the electricity supply apparatus 32-$k$ (the electricity supply apparatus at the position k) is detected is determined (S22). When a signal supplied from the electricity supply apparatus 32-$k$ is detected (S22, YES), the process proceeds to step S23, and a wireless signal including ID information and the like is transmitted to the charging stand 33.

Next, whether or not a permission to receive electricity supply from the charging stand 33 has been obtained is determined (S24). When the permission to receive electricity supply has been obtained (S24, YES), the process proceeds to step S25, and a process to receive electricity from the electricity supply apparatus 32-$k$ is performed.

Figure 7:
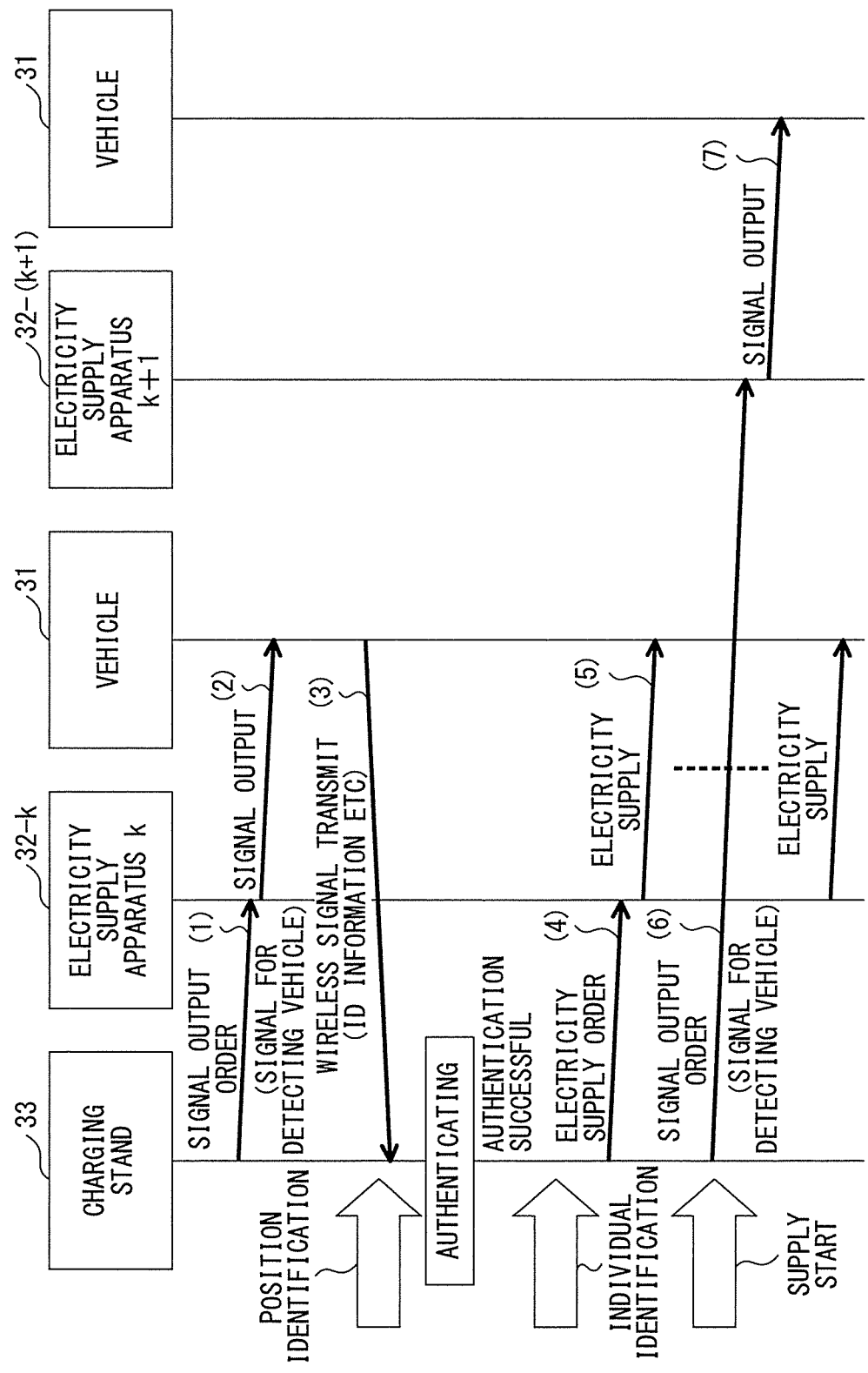
FIG. 7 is a sequence diagram of the signal in a charging stand and an electricity supply apparatus.

FIG. 7 is a diagram illustrating a sequence of a signal transmitted/received between the charging stand 33 and the electricity supply apparatus 32-$k$ and the vehicle 31.

The charging stand 33 transmits a signal output order (signal) to a selected electricity supply apparatus 32-$k$ among the plurality of electricity supply apparatus 32-1 through 32-N through the power line 34 (or the signal line 51) (FIG. 7, (1)).

Upon receiving a signal output order from the charging stand 33, the electricity supply apparatus 32-$k$ outputs a desired signal from the coil 38-$k$ (FIG. 7, (2)).

When the vehicle 31 is stopped at the position of the electricity supply apparatus 32-$k$ and a signal is received from the electricity supply apparatus 32-$k$, a wireless signal including ID information and the like is transmitted to the charging stand 33 (FIG. 7, (3)).

When a wireless signal is received within a certain period of time after outputting a signal output order to the electricity supply apparatus 32-$k$, the charging stand 33 determines that the vehicle 31 is stopped at the position of the electricity supply apparatus 32-$k$ (position identification). Then, authentication is performed using the ID information included in the wireless signal, and when the authentication is successful (identification of the vehicle), an electricity supply order signal to order the start of electricity supply is transmitted to the electricity supply apparatus 32-$k$ (FIG. 7, (4)).

Upon receiving an electricity supply order from the charging stand 33, the electricity supply apparatus 32-$k$, lets required current flow in the coil 38-$k$, to start supply of electricity (FIG. 7, (5)).

The charging stand 33 selects the next electricity supply apparatus (for example, 32-($k$+1)), and transmits a signal output order (FIG. 7, (6)).

Upon receiving a signal output order from the charging stand 33, the electricity supply apparatus 32-($k$+1) lets desired current flow in the coil and outputs a signal (FIG. 7, (7)).

Figure 8:
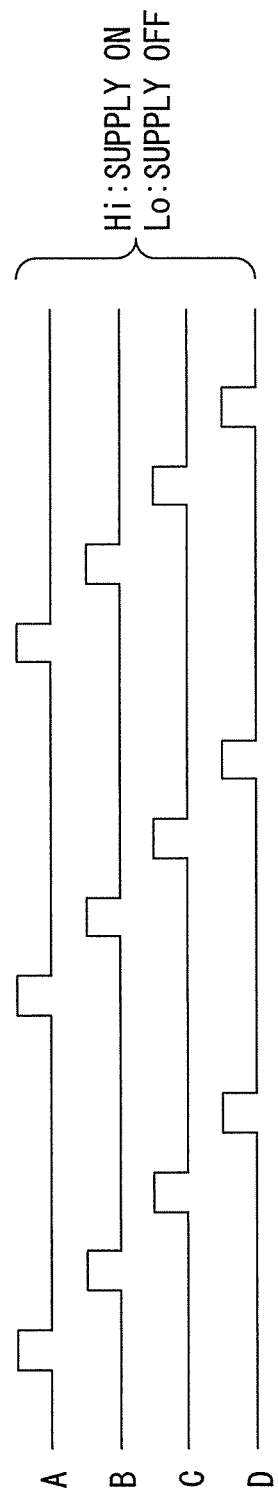
FIG. 8 is a timing chart of a signal output from a charging stand to an electricity supply apparatus.

FIG. 8 is a timing chart illustrating the timing chart of signal output orders A through D output from the charging stand 33 to the four electricity supply apparatus 32-1 through 32-4.

The signal output orders A through D are signals output so that the electricity supply apparatuses 32-1 through 32-4 may supply electricity respectively at a different timing, as illustrated in FIG. 8.

The signal output order A is a signal that becomes the high level for a certain period of time first, and becomes the low level after that. The signal output order B is a signal that becomes the high level for a certain period of time after the signal output order A changes to the low level, and becomes the low level after that. The Signal output order C is a signal that becomes the high level for a certain period of time after the signal output order B changes to the low level, and becomes the low level after that. The signal output order D is a signal that becomes the high level for a certain period of time after the signal output order C changes to the low level, and becomes the low level after that.

After the signal output order D changes to the low level, the signal output order A becomes the high level for a certain period of time, again. After that, the change of the signals described above it repeated.

The charging stand 33 first outputs a signal output order A illustrated in FIG. 8 to the electricity supply apparatus 32-1.

Figure 9:
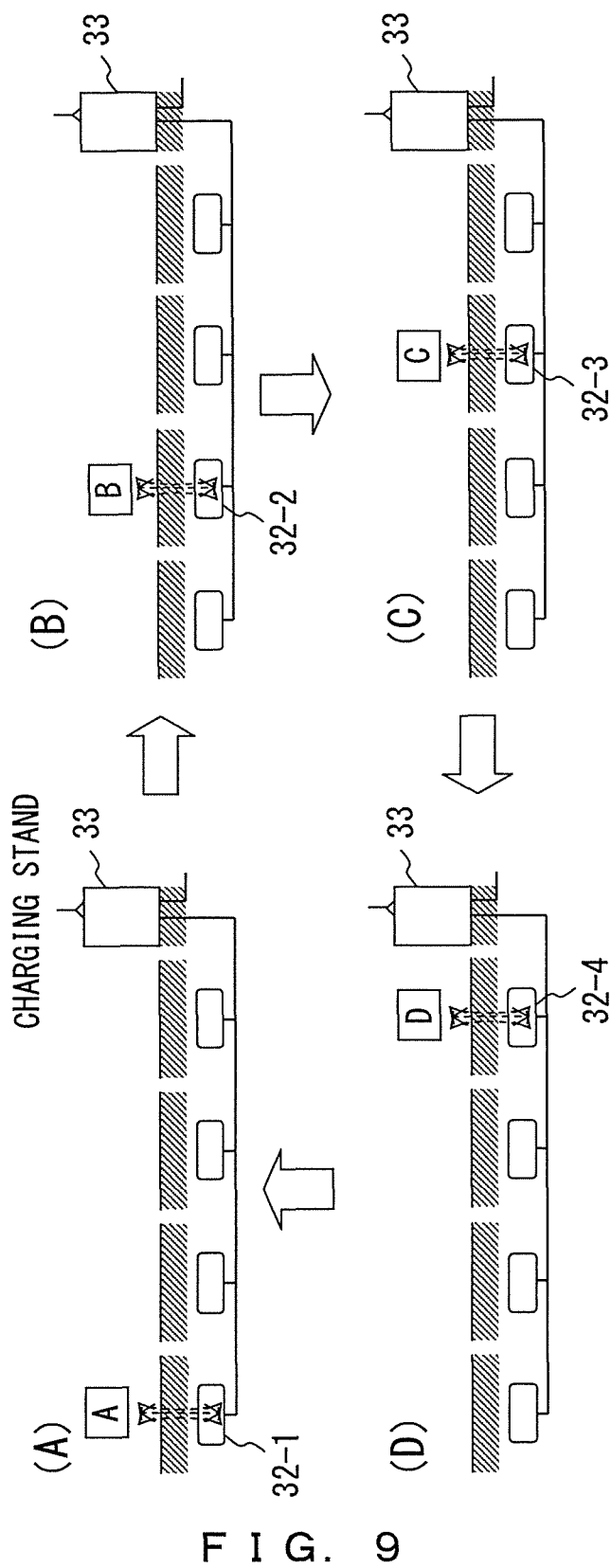
FIG. 9 is an action illustration diagram of a electricity supply apparatus.

FIG. 9 is an action illustration diagram of the electricity supply apparatuses 32-1 through 32-4 at the time when the signal output orders A through D are given from the charging stand 33.

First, the charging stand 33 outputs the signal output order A to the electricity supply apparatus 32-1. FIG. 9 (A) illustrates the action of the electricity supply apparatus 32-1 at this time. The electricity supply apparatus 32-1 lets electric current flow in the coil 38-1 during the period in which the signal output order A is at the high level and releases the signal to space.

Next, the charging stand 33 outputs a signal output order B to the electricity supply apparatus 32-2 after the signal output order A changes to the low level. FIG. 9 (B) illustrates the action of the electricity supply apparatus 32-2 at this time. The electricity supply apparatus 32-2 lets electric current flow in the coil 38-2 during the period in which the signal output order B is at the high level and releases the signal to space.

Next, the charging stand 33 outputs a signal output order C to the electricity supply apparatus 32-3 after the signal output order B changes to the low level. FIG. 9 (C) illustrates the action of the electricity supply apparatus 32-3 at this time. The electricity supply apparatus 32-3 lets electric current flow in the coil 38-3 during the period in which the signal output order C is at the high level and releases the signal to space.

Next, the charging stand 33 outputs a signal output order D to the electricity supply apparatus 32-4. FIG. 9 (D) illustrates the action of the electricity supply apparatus 32-4 at this time. The electricity supply apparatus 32-4 lets electric current flow in the coil 38-4 (the coil 38 of the fourth electricity supply apparatus 32-4) during the period in which the signal output order D is at the high level and releases the signal to space. After that, the actions after FIG. 9 (A) are repeated.

Figure 10:
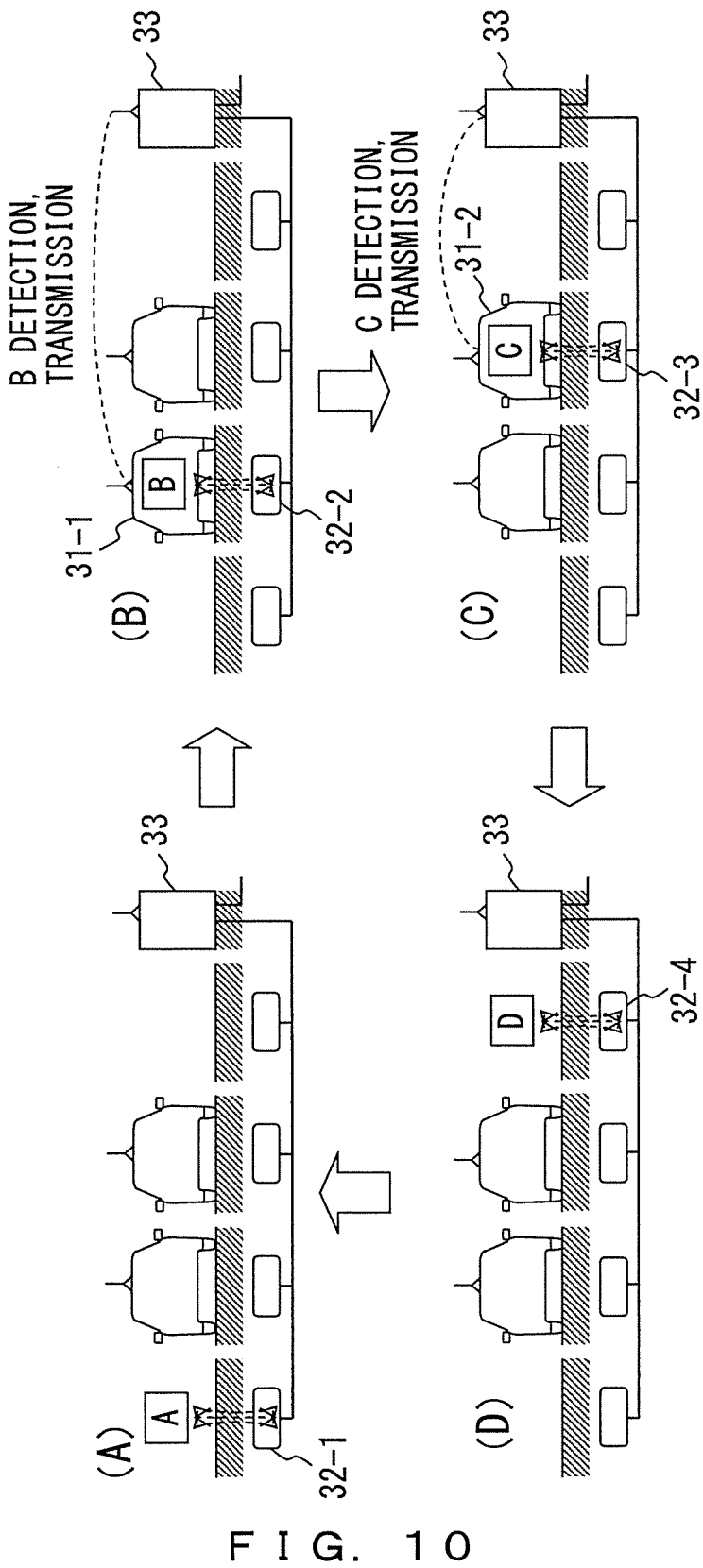
FIG. 10 is an action illustration diagram of a charging stand and an electricity supply apparatus.
Figure 11:
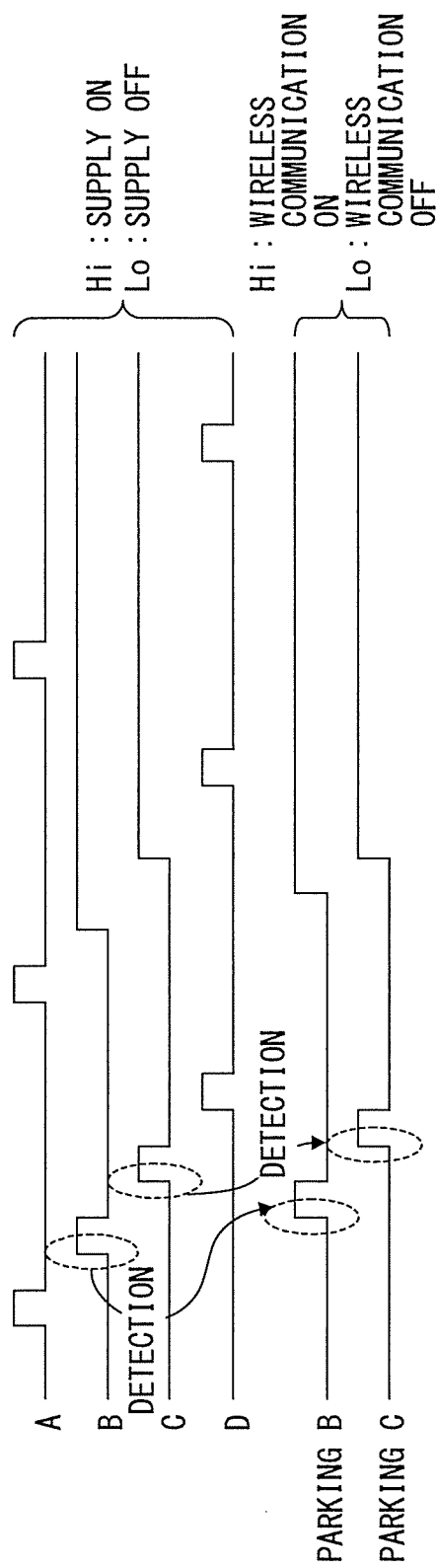
FIG. 11 is a timing chart of a signal output from a charging stand to an electricity supply apparatus and a wireless signal transmitted from a vehicle.

FIG. 10 is an action illustration diagram of the electricity supply apparatuses 32-1 through 32-4 and the vehicles 31-1, 31-2, and FIG. 11 is a timing chart of signal output orders A through D output from the charging stand 33 and the wireless signal output from the vehicles 31-1, 31-2.

Hereinafter, the actions in a case in which the vehicles 31-1, 32-2 are stopped at the positions of the electricity supply apparatus 32-2 and the electricity supply apparatus 32-3.

To the electricity supply apparatuses 32-1 through 32-4, the signal output orders A through D that become the high level at timings illustrated in FIG. 11 are given sequentially.

FIGS. 10 (A) and (D) are examples of a case in which no vehicle is stopped at the positions of the electricity supply apparatuses 32-1 and 32-4, and the actions in this case are the same as in FIGS. 9 (A) and (D).

FIG. 11 (B) illustrates actions in a case in which the vehicle 31-1 is stopped at the position of the electricity supply apparatus 32-2.

Upon receiving the signal output order B from the charging stand 33, the electricity supply apparatus 32-2 lets electric current flow in the coil 38-2 during the period in which the signal output order B is at the high level, and release a signal to space. Since the vehicle 31-1 is parked at the position B of the electricity supply apparatus 32-2, it is able to receive the signal (electricity) supplied from the electricity supply apparatus 32-2 in a contactless manner. Upon receiving the supply of the signal from the electricity supply apparatus 32-2, the vehicle 31-1 transmits a wireless signal including ID information and the like to the charging stand 33 (signal illustrated as PARKING B in FIG. 11).

When a wireless signal is received within a certain period of time after outputting the signal output order B, the charging stand 33 determines that the vehicle 31-1 is parked at the position of the electricity supply apparatus 32-2. Upon determining that the vehicle 31-1 is stopped, the charging stand 33 orders the electricity supply apparatus 32-2 to start supplying electricity. Accordingly, the battery of the vehicle 31-1 may be charged.

FIG. 10 (C) illustrates actions in a case in which the vehicle 31-2 is stopped at the position of the electricity supply apparatus 32-3.

Upon receiving the signal output order C from the charging stand 33, the electricity supply apparatus 32-3 lets electric current flow in the coil 38-3 during the period in which the signal output order C is at the high level, and release a signal to space. Since the vehicle 31-2 is parked at the position of the electricity supply apparatus 32-3, it is able to receive the signal supplied from the electricity supply apparatus 32-3 in a contactless manner. The vehicle 31-2 transmits a wireless signal including ID information and the like to the charging stand 33 (signal illustrated as PARKING C in FIG. 11) within a certain period of time after receiving the signal from the electricity supply apparatus 32-3.

When a wireless signal is received within a certain period of time after transmitting the signal output order C, the charging stand 33 determines that the vehicle 31-2 is parked at the position of the electricity supply apparatus 32-3. Upon determining that the vehicle 31-2 is parked, the charging stand 33 orders the electricity supply apparatus 32-3 to start supplying electricity. Accordingly, the battery of the vehicle 31-2 may be charged.

According to the second embodiment described above, the charging stand 33 is able to identify the position of which electricity supply apparatus among the plurality of electricity supply apparatus 32-1 through 32-N the vehicle 31 is parked at. Therefore, since there is no need to provide a sensor and the like in the electricity supply apparatuses 32-1 through 32-N to detect the vehicle 31, the cost for the apparatus may be reduced.

While the communication between the charging stand 33 and the electricity supply apparatuses 32-1 through 32-N is performed by the power line communications (PLC), this is not a limitation. A signal line may be provided separately, and the communication may be performed using the signal line.

What is claimed is:

1. A control apparatus configured to control a plurality of supply apparatuses that supply a signal to a moving apparatus in a contactless manner, comprising:
   a wireless unit configured to perform transmission/reception of a wireless signal; and
   a control unit configured to output an order signal to order a plurality of supply apparatuses to perform supply of a signal in a contactless manner at a respectively different timing, and also to determine that the moving apparatus is stopped at a position of the supply apparatus being an output destination of the order signal, when a wireless signal is received in the wireless unit from the moving apparatus within a certain period of time after outputting the order signal.

2. The control apparatus according to claim 1, wherein
   the supply apparatus is an apparatus that supplies electricity to the moving apparatus in a contactless manner, and
   the control unit outputs a signal to the supply apparatus being an output destination of the order signal to order start of supply or electricity, when a wireless signal is received in the wireless unit from the moving apparatus within a certain period of time after outputting the order signal.

3. The control apparatus according to claim 1, wherein
   the control unit makes a first order signal to order a first supply apparatus among the plurality of supply apparatuses to supply a signal valid for a certain period of time, to make the first supply apparatus supply a signal in a contactless manner, and after that, making the first order signal invalid, and makes a second order signal to order a second supply apparatus to supply a signal valid for a certain period of time, to make the second supply apparatus supply a signal in a contactless manner, and after that, makes the second order signal invalid.

4. The control apparatus according to claim 1, wherein
   the control unit transmits the order signal by power line communications to the plurality of supply apparatuses.

5. A control method to control a plurality of supply apparatuses that supply a signal to a moving apparatus in a contactless manner, comprising:
   outputting an order signal to order a plurality of supply apparatuses to perform supply of a signal in a contactless manner at a respectively different timing, and also determining that the moving apparatus is stopped at a position of the supply apparatus being an output destination of the order signal, when a wireless signal is received from the moving apparatus within a certain period of time after outputting the order signal.

6. The control method of supply apparatuses according to claim 5, wherein
   the supply apparatus is an apparatus that supplies electricity to the moving apparatus in a contactless manner, and
   a signal is output to the supply apparatus being an output destination of the order signal to order start of supply of electricity, when a wireless signal is received from the moving apparatus within a certain period of time after outputting the order signal.

7. The control method of supply apparatuses according to claim 5, wherein
   a first order signal to order a first supply apparatus among the plurality of supply apparatuses to supply a signal is made valid for a certain period of time, to make the first supply apparatus supply a signal in a contactless manner, and after that, the first order signal is made invalid, and a second order signal to order a second supply apparatus to supply a signal is made valid for a certain period of time, to make the second supply apparatus supply a signal, and after that, the second order signal is made invalid.

8. A supply system comprising:

a plurality of supply apparatuses that supply a signal to a moving apparatus in a contactless manner; and a control apparatus comprising a wireless unit configured to perform transmission/reception of a wireless signal; and a control unit configured to output an order signal to order a plurality of supply apparatuses to perform supply of a signal at a respectively different timing, and also to determine that the moving apparatus is stopped at a position of the supply apparatus being an output destination of the order signal, when a wireless signal is received from the moving apparatus within a certain period of time after outputting the order signal.

9. The supply system according to claim 8, wherein the supply apparatus is an apparatus that supplies electricity to the moving apparatus in a contactless manner, and the control apparatus outputs a signal to the supply apparatus being an output destination of the order signal to order start of supply or electricity, when a wireless signal is received from the moving apparatus within a certain period of time after outputting the order signal.

* * * * *